(12) United States Patent
Boyle

(10) Patent No.: US 7,194,576 B1
(45) Date of Patent: Mar. 20, 2007

(54) FETCH OPERATIONS IN A DISK DRIVE CONTROL SYSTEM

(75) Inventor: William B. Boyle, Lake Forest, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 384 days.

(21) Appl. No.: 10/633,090

(22) Filed: Jul. 31, 2003

(51) Int. Cl.
*G06F 12/08* (2006.01)

(52) U.S. Cl. ............... 711/113; 711/125; 711/138; 711/112

(58) Field of Classification Search ............... None
See application file for complete search history.

(56) References Cited

U.S. PATENT DOCUMENTS

| | | | | |
|---|---|---|---|---|
| 6,418,516 | B1 * | 7/2002 | Arimilli et al. | 711/138 |
| 6,647,463 | B2 * | 11/2003 | Yamashiroya | 711/118 |
| 6,922,754 | B2 * | 7/2005 | Liu et al. | 711/138 |
| 2002/0065994 | A1 * | 5/2002 | Henson et al. | 711/151 |
| 2002/0069351 | A1 * | 6/2002 | Chi et al. | 712/239 |
| 2002/0087803 | A1 * | 7/2002 | Jones et al. | 711/138 |
| 2004/0044847 | A1 * | 3/2004 | Ray et al. | 711/122 |

* cited by examiner

*Primary Examiner*—B. James Peikari
(74) *Attorney, Agent, or Firm*—Jason T. Evans, Esq.; Ramin Mobarhan, Esq.

(57) ABSTRACT

A method and system for improving fetch operations between a micro-controller and a remote memory via a buffer manager in a disk drive control system comprising a micro-controller, a micro-controller cache system having a cache memory and a cache-control subsystem, and a buffer manager communicating with micro-controller cache system and remote memory. The invention includes receiving a data-request from micro-controller in cache control subsystem wherein the data-request comprises a request for at least one of instruction code and non-instruction data. The invention further includes providing the requested data to micro-controller if the requested data reside in cache memory, determining if the received data-request is for non-instruction data if requested data does not reside in cache memory, fetching the non-instruction data from remote memory by micro-controller cache system via buffer manager, and bypassing cache memory to preserve the contents of cache memory and provide the fetched non-instruction data to micro-controller.

14 Claims, 4 Drawing Sheets

FETCH OPERATIONS IN A DISK DRIVE CONTROL SYSTEM

FIELD OF THE INVENTION

This invention relates to disk drive control system. More particularly, the present invention is directed to improving fetch operations in a disk drive control system.

BACKGROUND OF THE INVENTION

Disk Drives commonly employ one or more microprocessors or microcontrollers (the terms are used interchangeably) in an embedded control system to control operations of the drive. In order to maximize the performance of the microprocessor, a cache control system is frequently included which minimizes the access time for fetching instructions and data from memory.

As is well known in the art, a cache system depends on locality of reference to provide the expected performance improvement. This means that the memory address range for a particular segment of program code being executed tends to be co-extensive with the range of memory data being stored in the cache. Therefore most accesses after the cache is initially loaded will be in the cache—i.e. a cache "hit". When a memory access address falls outside the cached segment, i.e. a "cache miss" occurs, the cache control system directs the access to main memory and store the new data in the cache. Generally, when a cache miss occurs, the cache control system fetches a string or burst of data sequential to the miss address, anticipating that subsequent requests will be sequential. Because the cache memory in most embedded systems is quite small, the cache miss generally causes most, if not all, of the existing cached data to be replaced by the fetched burst of sequential data.

Unfortunately, in many instances, a cache miss may occur because the program is fetching an operand which is outside the range of the executing code segment, even though the code segment continues to be executed. This can result in severe "thrashing" of data in the cache thereby diminishing or losing the benefit of the cache system.

In prior art cache systems, a so-called "Harvard" architecture has been used which attempts to solve the foregoing problem by providing separate cache structures for instructions and data. Unfortunately, the Harvard architecture is more complex and may unduly increase die size and cost in integrated circuits commonly used for disk drive embedded control systems.

Accordingly, what is needed is an improved disk drive cache control system which provides beneficial cache performance without incurring cost penalties in an integrated circuit.

SUMMARY OF THE INVENTION

This invention can be regarded as a method for improving fetch operations between a micro-controller and a remote memory via a buffer manager in a disk drive control system comprising a micro-controller, a micro-controller cache system having a cache memory and a cache-control subsystem, and a buffer manager communicating with the micro-controller cache system and a remote memory. The method includes receiving a data-request from the micro-controller in the cache control subsystem wherein the data-request comprises a request for at least one of an instruction code and non-instruction data and providing the requested data to the micro-controller if the requested data reside in the cache memory.

The method further includes determining if the received data-request is for a non-instruction data if the requested data does not reside in the cache memory, fetching the non-instruction data from the remote memory by the micro-controller cache system via the buffer manager; and bypassing the cache memory to preserve the contents of the cache memory and provide the fetched non-instruction data to the micro-controller.

This invention can also be regarded as a disk drive control system comprising a micro-controller, and a micro-controller cache system in communication with the micro-controller and comprising a cache memory and a cache-control subsystem.

The micro-controller cache system is adapted to: a) receive a data-request from the micro-controller in the cache control subsystem wherein the data request comprises a request for at least one of an instruction code and non-instruction data, b) provide the requested data to the micro-controller if the requested data reside in the cache memory, c) determine if the received data-request is for a non-instruction data if the requested data does not reside in the cache memory, d) fetch the non-instruction data from the remote memory via the buffer manager adapted to provide the micro-controller cache system with micro-controller requested data stored in a remote memory, and e) bypass the cache memory to preserve the contents of the cache memory and to provide the fetched non-instruction data to the micro-controller.

DETAILED DESCRIPTION OF THE INVENTION

Figure 1:
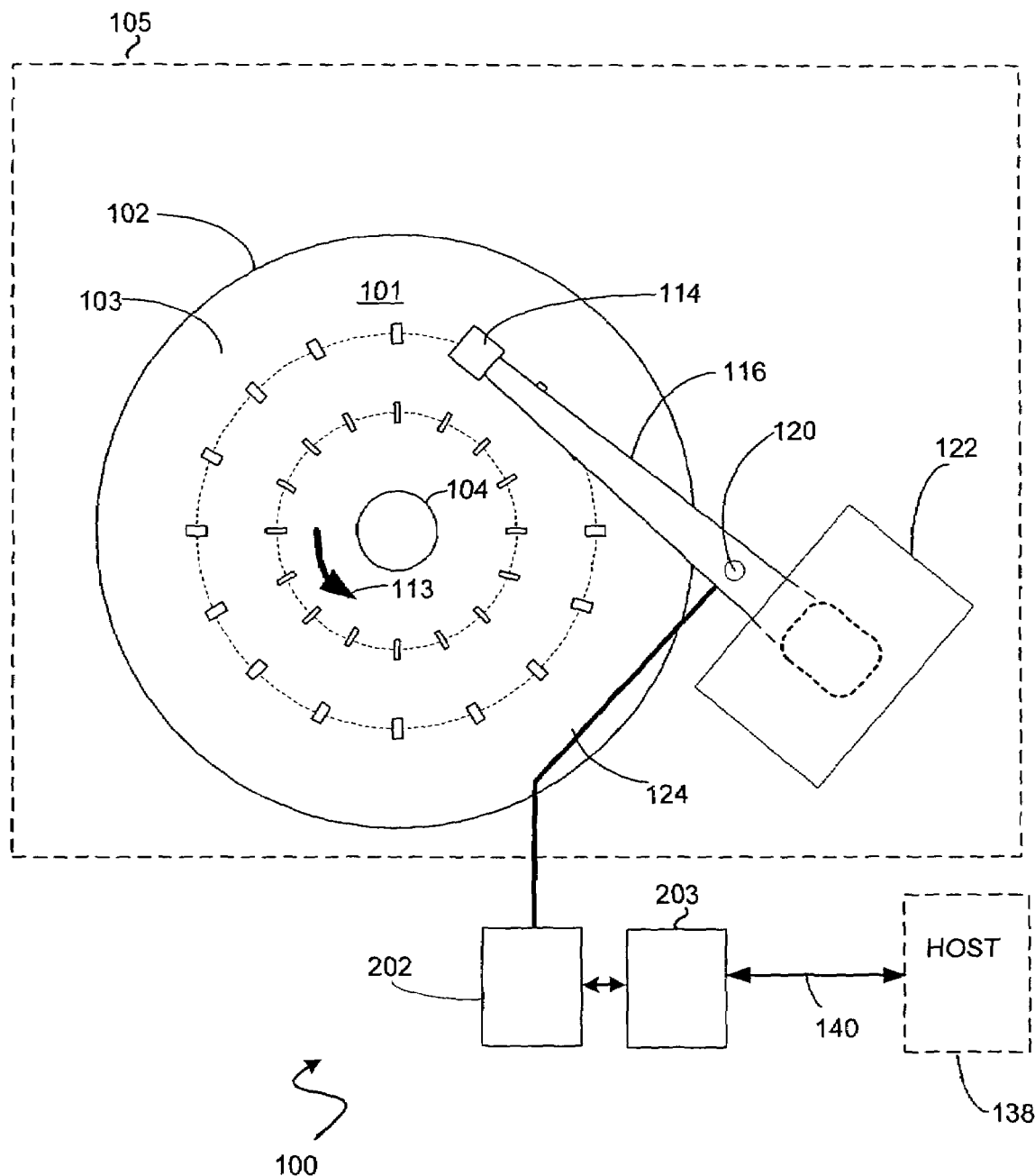
FIG. 1 illustrates an exemplary hard disk drive in which the present invention may be practiced.

With reference to FIG. 1, an exemplary hard disk drive 100 in which the present invention may be practiced is shown. As shown, the hard disk drive 100 includes a head disk assembly (HDA) 105 having one or more disks 102 with a magnetic media 101 formed on each surface 103 of a disk 102. The HDA 105 further comprises a transducer head 114 mounted on a rotary actuator 116 that rotates about a pivot 120 via controlled torques applied by a voice coil motor 122. While the disk drive 100 is in operation, the disk 102 rotates in an exemplary direction 113 about the axis of the spindle 104 at a substantially fixed angular speed such that the surface 103 of the disk 102 moves relative to the head 114.

As shown in FIG. 1, a signal bus 124, such as a flex cable, interconnects the HDA 105 to a control system 202 which can control the movement of the actuator 116 in a manner well known in the art. In addition, the control system 202 sends to and receives signals from the head 114 during read and write operations performed on the disk 102. As also shown in FIG. 1, the control system 202 is interconnected to the interface control system 203 which is in turn interconnected to a host computer 138 by a bus 140 for transferring of data between the hard disk drive 100 and the host 138.

Figure 2:
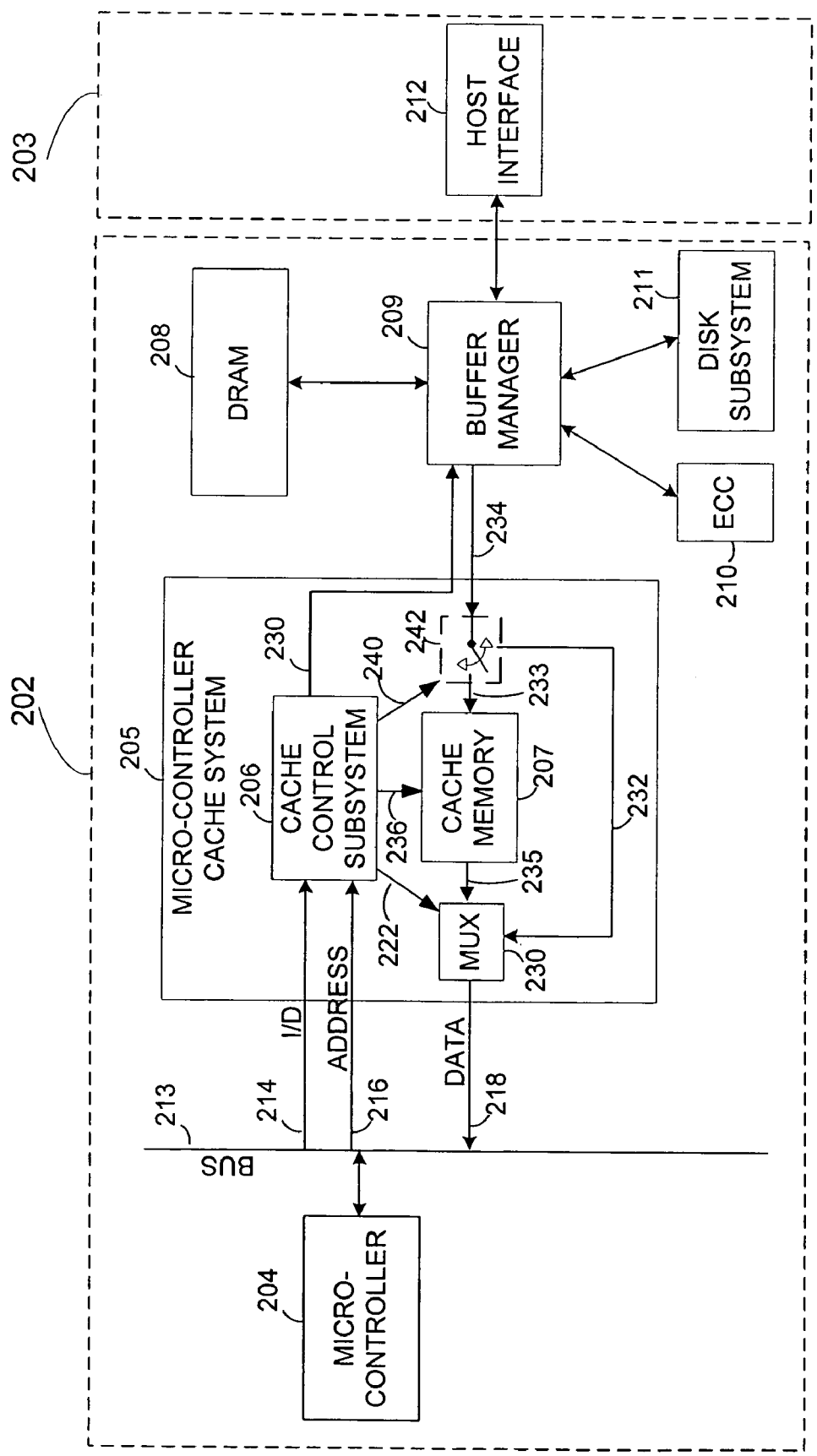
FIG. 2 illustrates a diagram of an exemplary control system of the disk drive shown in FIG. 1.

FIG. 2 is a block a diagram of an exemplary control system 202 of a disk drive shown in FIG. 1. As shown in FIG. 2, the control system 202 comprises a micro-controller 204, a micro-controller cache system 205 having a cache memory 207 and a cache-control subsystem 206, and a buffer manager 209 communicating with the micro-controller cache system 205, a remote memory 208, such as dynamic random access memory (DRAM), and control system clients such as error correction code subsystem 210, host interface subsystem 212 residing in the interface control system 203, and disk subsystem 211 which comprises a read/write channel (not shown), a voice coil motor driver (not shown), and a spindle motor driver (not shown). In an exemplary embodiment, the micro-controller 204 is an Advanced RISC (reduced instruction set computer) Machine (ARM) microprocessor with an ARM 'C' compiler.

Figure 3:
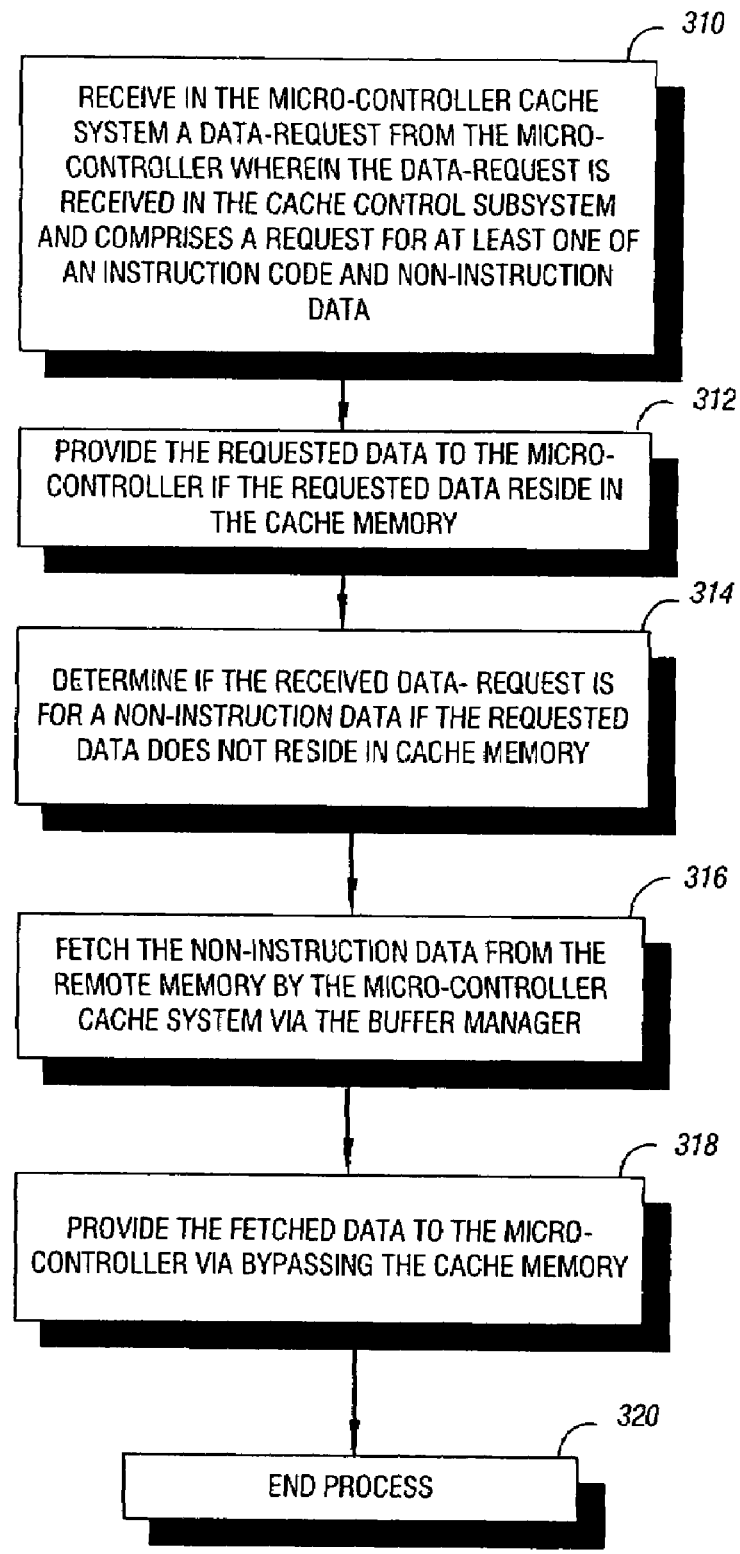
FIG. 3 is a flow chart illustrating a process used in an embodiment of the invention.

FIG. 3 in conjunction with FIG. 2 illustrate which the process of the present invention for improving fetch operations between the micro-controller 204 and the remote memory 208 via the buffer manager 209. The process starts in block 310 where the data-request 216 from the micro-controller 204 is received in the cache control subsystem 206, such via a data bus 213. In an exemplary embodiment, the data bus 213 is Advanced High-Performance Bus (AHB) of an Advanced Micro-controller Bus Architecture (AMBA). The data-request 216 comprises a request for an instruction code or non-instruction data. Suitably, the data-request 216 comprises a memory address of the instruction code or non-instruction data residing in the remote memory 208. In an exemplary embodiment, the instruction code is an ARM instruction code. Next, in block 312, the requested data is provided to the micro-controller 204 if the requested data reside in the cache memory 207. Suitably, the cache-control subsystem 206 determines if the requested data reside in the cache memory 207 and via an instruction 236 to cache memory 207 provides the requested data to the micro-controller 204 via path 235 and busses 218 and 213. In an exemplary embodiment, a multiplexer 230 operated by the cache-control subsystem 206 via signal 222 is used to select the provided data for transmission across bus 218.

The flow then proceeds to block 314, in which it is determined if the received data-request 216 is for a non-instruction data if the requested data does not reside in the cache memory 207. Suitably, the cache-control subsystem 206 determines if the received data-request 216 is for a non-instruction data based on a signal 214 received from the micro-controller. In an exemplary embodiment, the signal 214 is an HPROT[0] signal on the AHB implemented in a cache-control subsystem 206 having a cache-line architecture in which different cache lines are used to separate storage of non-instruction data from the instruction code. Next, in block 316, the non-instruction data is fetched from the remote memory 208 by the micro-controller cache system 206 via the buffer manager 209, as described below and in greater detail on conjunction with FIG. 4.

The flow then proceeds to block 318, in which the fetched non-instruction data is provided to the micro-controller 204 by bypassing the cache memory 207, such as via path 232 so to preserve the contents of the cache memory 207. In an exemplary embodiment, a switch 242 operated by the cache-control subsystem 206 via signal 240, is used to direct the flow of fetched non-instruction data from path 234 to the cache-bypass 232. The fetched non-instruction data is then provided to the micro-controller 204 via busses 218 and 213. In an exemplary embodiment, a multiplexer 230 operated by the cache-control subsystem 206 via signal 222 is used to select the fetched non-instruction data for transmission across bus 218. The flow in FIG. 3 then proceeds to block 320 in which the overall process ends.

One advantage of the foregoing feature of the present invention over the prior art is that in bypassing the cache memory 207 if an instruction code demands a non-instruction data that does not reside in the cache memory 207, the micro-controller cache system 205 provides beneficial cache performance without incurring cost penalties in an integrated circuit.

Figure 4:
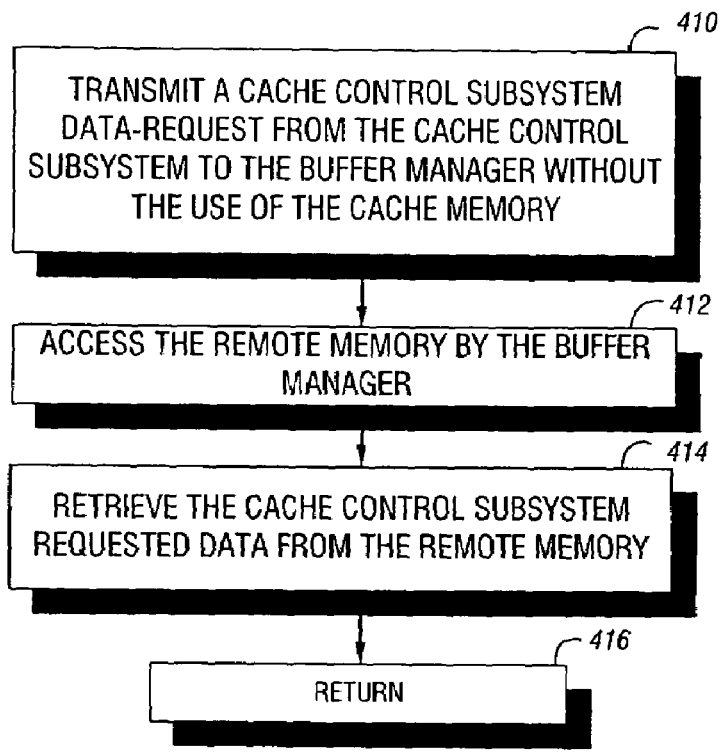
FIG. 4 is a flow chart further illustrating the process used in an embodiment of the invention shown in FIG. 3.

FIG. 4 is a flow chart further illustrating the process used in block 316 of FIG. 3 in which the non-instruction data is fetched from the remote memory 208 by the micro-controller cache system 206 via the buffer manager 209. As shown in FIG. 3, the process begins in block 410 in which the cache control subsystem 206 transmits a cache control subsystem data-request 230 to the buffer manager 209. Suitably, the cache control subsystem data-request 230 includes the received memory address provided by the data-request 216. Next, in block 412, the remote memory 208 is accessed by the buffer manage 209 based on the memory address included in the cache control subsystem data-request 230. Next in block 414, the cache control subsystem requested data is retrieved from the remote memory 208. The flow then proceeds to block 416 for returning to block 316 of FIG. 3.

Figure 5:
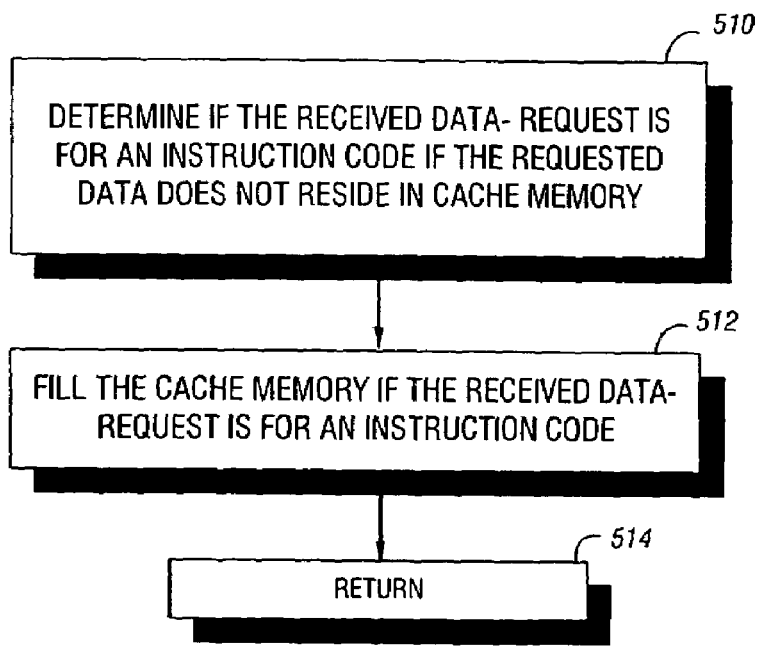
FIG. 5 is another flow chart further illustrating the process used in an embodiment of the invention shown in FIG. 3.

FIG. 5 is a flow chart illustrating a process used in conjunction with the process shown in FIG. 3. The process begins in block 510 in which it is determined if the received data-request 216 is for an instruction code if the requested data does not reside in the cache memory 207. Suitably, the cache-control subsystem 206 determines if the received data-request 216 is for an instruction code based on a signal 214 received from the micro-controller. Next, in block 512, the cache memory 207 is filled if the received data-request 216 is for an instruction code. Suitably, the cache memory 207 is filled with a burst fill received from buffer manager 209. In an exemplary embodiment, a switch 242 operated by the cache-control subsystem 206 via signal 240, is used to direct the flow of instruction code from path 234 to the cache input 233. The cache-control subsystem 206 then via an instruction 236 to cache memory 207 provides the burst fill instruction code stored in the cache memory 207 to the micro-controller 204. In an exemplary embodiment, a multiplexer 230 operated by the cache-control subsystem 206 via signal 222 is used to select the instruction code traversing path 235 for transmission across bus 218. Next, the flow in FIG. 5 proceeds to block 514 for returning to block 320 of FIG. 3 in which the overall process ends.

It should be noted that the various features of the foregoing embodiments were discussed separately for clarity of description only and they can be incorporated in whole or in part into a single embodiment of the invention having all or some of these features.

What is claimed is:

1. In a disk drive comprising a micro-controller, a micro-controller cache system in communication with the micro-controller and having a cache memory, a remote memory, and a buffer manager in communication with the micro-controller cache system and the remote memory, a method of providing data requested by the micro-controller comprising:

sending a request for data from the micro-controller to the micro-controller cache system;

determining whether the data request corresponds to data cached in the cache memory;

determining whether the data request corresponds to an instruction code or non-instruction data; and if the data request corresponds to an instruction code that is not cached in the cache memory:
- fetching the instruction code from the remote memory via the buffer manager,
- filling the cache memory with the instruction code, and
- providing the cached instruction code to the micro-controller; and if the data request corresponds to non-instruction data that is not cached in the cache memory:
- fetching the non-instruction data from the remote memory via the buffer manager, and
- sending the non-instruction data uncached from the buffer manager to the micro-controller via the micro-controller cache system.

2. The method of claim 1, wherein determining whether the data request corresponds to an instruction code or non-instruction data is based on a signal received from the micro-controller.

3. The method of claim 1, wherein fetching further comprises:
- sending a micro-controller cache system request from the micro-controller cache system to the buffer manager;
- accessing the remote memory from the buffer manager; and
- retrieving data corresponding to the micro-controller cache system request from the remote memory.

4. The method of claim 1, wherein the buffer manager is further in communication with a plurality of control system clients and provides client-requested data to the clients from the remote memory.

5. The method of claim 4, wherein the plurality of control system clients comprises at least one of a disk subsystem, an error correction code subsystem, and a host interface subsystem.

6. The method of claim 1, wherein the remote memory comprises a dynamic random access memory (DRAM).

7. The method of claim 1, wherein filling the cache memory comprises burst filling the cache memory.

8. A disk drive control system comprising:
- a micro-controller;
- a remote memory;
- a buffer manager in communication with the remote memory; and
- a micro-controller cache system in communication with the micro-controller and the buffer manager and having a cache memory, the micro-controller cache system adapted to:
  - receive a request for data from the micro-controller;
  - determine whether the data request corresponds to data cached in the cache memory;
  - determine whether the data request corresponds to an instruction code or non-instruction data; and
  - if the data request corresponds to an instruction code that is not cached in the cache memory:
    - fetch the instruction code from the remote memory via the buffer manager,
    - fill the cache memory with the instruction code, and
    - provide the cached instruction code to the micro-controller; and
  - if the data request corresponds to non-instruction data that is not cached in the cache memory:
    - fetch the non-instruction data from the remote memory via the buffer manager, and
    - send the non-instruction data uncached from the buffer manager to the micro-controller via the micro-controller cache system.

9. The disk drive control system of claim 8, wherein the micro-controller cache system is adapted to determine whether the data request corresponds to an instruction code or non-instruction data based on a signal received from the micro-controller.

10. The disk drive control system of claim 8, wherein the micro-controller cache system is adapted to fetch data from the remote memory by:
- sending a micro-controller cache system request to the buffer manager; and
- receiving data corresponding to the micro-controller cache system request from the buffer manager.

11. The disk drive control system of claim 8, wherein the buffer manager is further in communication with a plurality of control system clients and provides client-requested data to the clients from the remote memory.

12. The disk drive control system of claim 11, wherein the plurality of control system clients comprises at least one of a disk subsystem, an error correction code subsystem, and a host interface subsystem.

13. The disk drive control system of claim 8, wherein the remote memory comprises a dynamic random access memory (DRAM).

14. The disk drive control system of claim 8, wherein the cache memory is filled with a burst fill.

* * * * *